United States Patent
Patel et al.

(10) Patent No.: US 12,032,842 B2
(45) Date of Patent: Jul. 9, 2024

(54) HOST DEVICE WITH MULTI-PATH LAYER CONFIGURED FOR ALIGNMENT TO STORAGE SYSTEM LOCAL-REMOTE DESIGNATIONS

(71) Applicant: Dell Products L.P., Round Rock, TX (US)

(72) Inventors: Rimpesh Patel, Bangalore (IN); Amit Pundalik Anchi, Bangalore (IN); Vinay G. Rao, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 109 days.

(21) Appl. No.: 17/962,599

(22) Filed: Oct. 10, 2022

(65) Prior Publication Data

US 2024/0118820 A1    Apr. 11, 2024

(51) Int. Cl.
  *G06F 3/06* (2006.01)
(52) U.S. Cl.
  CPC .......... *G06F 3/0635* (2013.01); *G06F 3/0604* (2013.01); *G06F 3/067* (2013.01)
(58) Field of Classification Search
  CPC ...... G06F 3/0604; G06F 3/061; G06F 3/0629; G06F 3/0632; G06F 3/0635; G06F 3/067
  USPC ..................................... 710/38, 74; 711/154
  See application file for complete search history.

(56) References Cited

U.S. PATENT DOCUMENTS

| | | | |
|---|---|---|---|
| 6,567,397 B1 | 5/2003 | Campana, Jr. et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Ilwoo Park
(74) *Attorney, Agent, or Firm* — Ryan, Mason & Lewis, LLP

(57) ABSTRACT

An apparatus in one embodiment includes at least one processing device comprising a processor coupled to a memory. The at least one processing device is configured to obtain in a host device information characterizing local-remote designations of respective first and second storage systems, one of which is designated as local and one of which is designated as remote, and to adjust path selection in a multi-path layer of the host device based at least in part on the obtained information characterizing the local-remote designations of the respective first and second storage systems. In some embodiments, a given logical storage device is accessible to the multi-path layer of the host device via a first set of paths to the first storage system and a second set of paths to the second storage system, and adjusting path selection in the multi-path layer comprises adjusting weights assigned to respective ones of the paths.

20 Claims, 6 Drawing Sheets

(56) References Cited

U.S. PATENT DOCUMENTS

| | | |
|---|---|---|
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 10,936,220 B2 | 3/2021 | Mallick et al. |
| 10,949,104 B2 | 3/2021 | Marappan et al. |
| 10,996,879 B2 | 5/2021 | Gokam |
| 11,016,699 B2 | 5/2021 | Anchi et al. |
| 11,016,783 B2 | 5/2021 | Rao et al. |
| 11,093,144 B1 | 8/2021 | Anchi et al. |
| 11,093,155 B2 | 8/2021 | Anchi et al. |
| 11,106,381 B2 | 8/2021 | Rao et al. |
| 11,126,363 B2 | 9/2021 | Tidke et al. |
| 11,157,203 B2 | 10/2021 | Gokam et al. |
| 11,366,590 B2 | 6/2022 | Mallick et al. |
| 11,366,771 B2 | 6/2022 | Smith et al. |
| 11,385,824 B2 | 7/2022 | Anchi et al. |
| 11,449,257 B2 | 9/2022 | Rao et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0028163 A1 | 1/2008 | Woods et al. |
| 2008/0043973 A1 | 2/2008 | Lai et al. |
| 2008/0201458 A1 | 8/2008 | Sall |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2015/0301970 A1 | 10/2015 | Armstead et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2016/0342349 A1* | 11/2016 | Borlick ................ G06F 3/0634 |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0045109 A1 | 2/2020 | Hegde et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0133523 A1* | 4/2020 | Xia ...................... G06F 3/0622 |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0109658 A1 | 4/2021 | Mallick et al. |
| 2021/0157502 A1 | 5/2021 | Rao et al. |
| 2021/0181965 A1 | 6/2021 | Anchi et al. |
| 2021/0255784 A1 | 8/2021 | Anchi et al. |
| 2021/0263665 A1 | 8/2021 | Rao et al. |
| 2022/0171559 A1 | 6/2022 | Anchi et al. |
| 2022/0179804 A1 | 6/2022 | Anchi et al. |
| 2022/0291851 A1* | 9/2022 | Tylik ...................... G06F 3/065 |

OTHER PUBLICATIONS

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: ISCSI Implementation for Dell EMC Storage Arrays Running PowerMaxOS," Technical White Paper, Sep. 2019, 35 pages.

(56) References Cited

OTHER PUBLICATIONS

NVM Express, "NVM Express Base Specification, Revision 2.0a," NVM Express, Jul. 23, 2021, 454 pages.
NVM Express, "NVM Express Base Specification, Revision 2.0b," NVM Express, Jan. 6, 2022, 455 pages.

\* cited by examiner

FIG. 4

LOCAL-REMOTE DESIGNATION INFORMATION MAINTAINED BY MPIO DRIVER OF HOST DEVICE FOR RESPECTIVE LOGICAL STORAGE DEVICES

| | PATH IDENTIFIERS | LOCAL-REMOTE DESIGNATORS |
|---|---|---|
| LUN 1 | | |
| LUN 2 | | |
| ... | | |
| LUN X | | |

400

| Bit<br>Byte | 7 | 6 | 5 | 4 | 3 | 2 | 1 | 0 |
|---|---|---|---|---|---|---|---|---|
| 0 | OPERATION CODE (1Ah) ||||||||
| 1 | Reserved |||| DBD | Reserved |||
| 2 | PC || PAGE CODE ||||||
| 3 | SUBPAGE CODE ||||||||
| 4 | ALLOCATION LENGTH ||||||||
| 5 | CONTROL ||||||||

FIG. 5

```
struct storageMetrodesignator{
    char storageSN[32];
    char storageDesignatedStatus[1];

```
if (pathInfo->bArrDesgRemote)
{
    /*
    ** bArrDesgRemote is TRUE only for path(s) belonging
    ** to array-designated remote stsys in Metro config.
    */
    weight = MPX_ADD_WEIGHTS_AND_CHECK_FOR_OVERFLOW(
            weight,
            MP_PATH_WEIGHT_FOR_ARRAY_DESG_REMOTE);
}
```

FIG. 7

… # HOST DEVICE WITH MULTI-PATH LAYER CONFIGURED FOR ALIGNMENT TO STORAGE SYSTEM LOCAL-REMOTE DESIGNATIONS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments configure a multi-path layer of one or more host devices to provide path selection aligned to storage system local-remote designations, where the local-remote designations illustratively comprise storage-side local-remote designations established by a storage administrator or other user. For example, the host device multi-path layer in some embodiments obtains information characterizing storage-side local-remote designations of first and second storage arrays arranged in a metro/stretched configuration or other active-active configuration, or in another configuration involving local-remote designations for respective ones of the storage arrays, and adjusts its path selection based at least in part on the obtained information characterizing the local-remote designations. Numerous other configurations involving at least first and second storage arrays or other types of storage systems having storage-side local-remote designations may additionally or alternatively be used.

These and other embodiments can provide significantly improved performance, for example, in situations in which the first and second storage systems are configured such that the host device communicates with the first storage system over a first set of paths and communicates with the second storage system over a second set of paths, where the first and second sets of paths have substantially different performance characteristics and the host device would not otherwise be aware of the storage-side local-remote designations.

In one embodiment, an apparatus comprises at least one processing device comprising a processor and a memory coupled to the processor. The at least one processing device is configured to obtain in a host device information characterizing local-remote designations of respective first and second storage systems, one of which is designated as local and one of which is designated as remote, and to adjust path selection in a multi-path layer of the host device based at least in part on the obtained information characterizing the local-remote designations of the respective first and second storage systems.

The at least one processing device illustratively comprises at least a portion of the host device, with the host device being coupled to the first and second storage systems via at least one network.

In some embodiments, a given logical storage device is accessible to the multi-path layer of the host device via a first set of paths to the first storage system and a second set of paths to the second storage system, and adjusting path selection in the multi-path layer comprises adjusting weights assigned to respective ones of the paths. For example, the weights may be adjusted such that a path selection algorithm implemented by the multi-path layer favors one or more of the paths to the storage system designated as local over one or more of the paths to the storage system designated as remote.

In some embodiments, at least portions of obtaining the information characterizing the local-remote designations and adjusting the path selection based at least in part on the obtained information are performed by at least one multi-path input-output (MPIO) driver configured to process IO operations of the host device that communicates with the first and second storage systems over the network.

These and other illustrative embodiments include, without limitation, apparatus, systems, methods and computer program products comprising processor-readable storage media.

BRIEF DESCRIPTION OF THE DRAWINGS

FIG. 4 shows an example of a host device data structure comprising obtained information characterizing storage-side local-remote designations in an illustrative embodiment.

FIG. 5 shows an example of a command that is utilized in an illustrative embodiment to allow a host device to obtain information characterizing storage-side local-remote designations of first and second storage arrays.

FIGS. 6 and 7 show examples of multi-pathing software code implemented in a multi-path layer of one or more host devices to provide host device multi-pathing aligned to storage-side local-remote designations in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
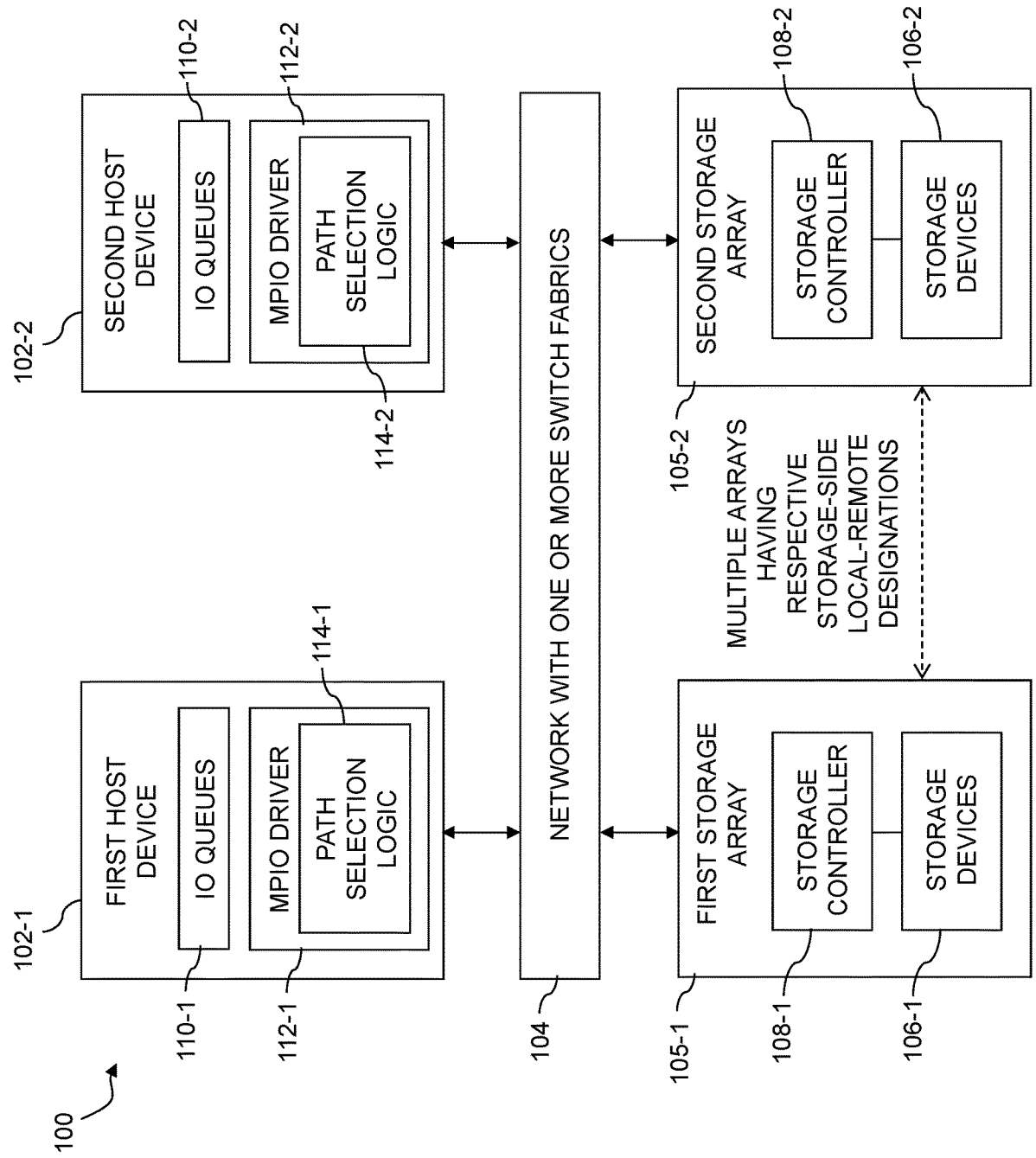
FIG. 1 is a block diagram of an information processing system configured with functionality for host device multi-pathing aligned to storage-side local-remote designations in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, also collectively referred to herein as first and second storage arrays 105, or simply storage arrays 105. For example, in some embodiments the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device and/or a single storage array.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The first and second storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices. In some embodiments, at least one of the storage arrays 105 illustratively comprises one or more PowerMax™ or PowerStore™ storage arrays, commercially available from Dell Technologies.

As another example, one or both of the storage arrays 105 may comprise respective clustered storage systems, each including a plurality of storage nodes interconnected by one or more networks. An example of a clustered storage system of this type is a scale-out all-flash content addressable storage array distributed over multiple storage nodes.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 illustratively implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104. The above-noted LUNs are examples of what are more generally referred to herein as logical storage volumes, or still more generally, logical storage devices.

The read and write commands in some embodiments more particularly comprise SCSI commands, although other types of commands may be used in other embodiments, including commands that are part of a standard command set, such as NVMe commands, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes.

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those application execute, from one server to another server.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with the NVMe access protocol, as described in the NVMe Base Specification, Revision 2.0b, Jan. 6, 2022, which is incorporated by reference herein. Other storage access protocols of this type that may be utilized in illustrative embodiments disclosed herein include NVMe over Fabric, also referred to as NVMeoF, and NVMe over Transmission Control Protocol (TCP), also referred to as NVMe/TCP.

It is assumed in illustrative embodiments that the storage arrays 105 are arranged in a configuration in which one of the storage arrays 105 is designated as a local storage array relative to at least one of the host devices 102, and the other one of the storage arrays 105 is designated as a remote storage array relative to at least one of the host devices 102. For example, the storage arrays may be arranged in a metro and/or stretched ("metro/stretched") configuration or other active-active configuration, or another type of configuration relative to one another that involves local-remote designations.

As a more particular illustration, the first and second storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The first and second storage arrays 105-1 and 105-2 in some embodiments may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

A given logical storage device implemented on one or both of the storage arrays 105 in the system 100 illustratively comprises a set of one or more LUNs or other logical storage volumes of one or both of the storage arrays 105. Each such LUN or other logical storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides functionality for path selection aligned to storage-side local-remote designations using respective instances of path selection logic 114-1 and 114-2 implemented within the MPIO drivers 112.

The MPIO drivers 112 may comprise, for example, otherwise conventional MPIO drivers, such as PowerPath® drivers from Dell Technologies, suitably modified in the manner disclosed herein to support at least portions of the disclosed functionality for path selection aligned to storage-side local-remote designations. Other types of MPIO drivers from other driver vendors may be suitably modified to incorporate functionality for path selection aligned to storage-side local-remote designations as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals. In illustrative embodiments herein, such path selection is advantageously aligned to storage-side local-remote designations of respective ones of the storage arrays 105.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical storage device of one of the storage arrays 105. The corresponding logical storage device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also illustratively configured to implement, utilizing its path selection logic 114-1, at least portions of the disclosed functionality for path selection aligned to storage-side local-remote designations in the host device 102-1. Other host device components, such as logic components implemented in one or more host device processors external to the MPIO driver 112-1, can additionally or alternatively implement aspects of such functionality of the host device 102-1. The disclosed embodiments are therefore not limited to embodiments in which functionality for path selection aligned to storage-side local-remote designations is controlled at least in part by an MPIO driver or multi-path layer.

Illustrative embodiments disclosed herein advantageously address and overcome problems that might otherwise arise when selecting paths for delivery of IO operations to storage arrays under the control of a host device.

For example, some embodiments disclosed herein can provide significantly improved performance in situations in which the storage arrays 105 are configured in accordance with a metro/stretched arrangement or other similar arrangement in which the host device 102-1 communicates with the first storage array 105-1 over a first set of paths and communicates with the second storage array 105-2 over a second set of paths, where the first and second sets of paths have substantially different performance characteristics, and where the host device 102-1 would otherwise be unaware of the storage-side local-remote designations.

In accordance with the functionality for path selection aligned to storage-side local-remote designations as disclosed herein, a given one of the host devices 102, illustratively the host device 102-1, is configured to obtain information characterizing local-remote designations of the respective first and second storage arrays 105, one of which is assumed to be currently designated as local and the other of which is assumed to be currently designated as remote. It should be noted that such storage-side designations may change over time, possibly responsive to control input provided by a storage administrator or other user. The host device 102-1 is further configured to adjust path selection in its multi-path layer comprising MPIO driver 112-1 based at least in part on the obtained information characterizing the local-remote designations of the respective first and second storage arrays 105.

The information characterizing local-remote designations of the respective first and second storage arrays 105 can comprise, for example, for each storage array, a corresponding single-bit indicator, with a first binary value of the single-bit indicator specifying that the storage array is designated as local, and a second binary value of the single-bit indicator specifying that the storage array is designated as remote. Multi-bit indicators and other types and arrangements of additional or alternative information can be used.

The local-remote designations may be temporary designations, and accordingly can vary over time, such that a storage array designated as local in a current time period may be designated as remote in a previous or subsequent time period, and vice versa. Terms such as "designated" and "designations" as used herein are therefore intended to be broadly construed, so as to encompass these and numerous other arrangements. The designation may be made by a storage administrator or other user, or in an at least partially automated manner based at least in part on one or more specified criteria, such as physical location of a storage array relative to one or more host devices.

The host device 102-1 is an example of what is more generally referred to herein as "at least one processing device" that includes a processor coupled to a memory. Other types and arrangements of one or more processing devices may be utilized in other embodiments to implement the disclosed functionality for path selection aligned to storage-side local-remote designations.

In some embodiments, the MPIO driver 112-1 is configured to issue one or more commands to at least one of the first and second storage arrays 105 in order to obtain in response thereto the information characterizing the local-remote designations of the respective first and second storage arrays 105. For example, a given such command can comprise at least one of a log sense command, a mode sense command, a vendor unique command or another type of command, illustratively in accordance with a particular storage access protocol, such as a SCSI access protocol or an NVMe access protocol.

The information characterizing the storage-side local-remote designations of the storage arrays 105 can be conveyed to the host device 102-1 in any of a wide variety of different types of responses, messages, notifications or other communications. For example, in some embodiments, such information can be conveyed in responses, messages, notifications or other types and arrangements of information that may be sent from a storage array to a host device, possibly in response to a request previously received from the host device, or that may be otherwise obtained by the host device from the storage array.

In some embodiments, the information characterizing the local-remote designations is obtained directly by the host device from the storage array, using an in-band arrangement based on the above-noted commands of a storage access protocol such as SCSI or NVMe, while in other embodiments such information may be obtained indirectly by the host device from the storage array using an out-of-band arrangement, possibly involving at least one intermediary device such as an MPIO management station or another type of external server. These and numerous other in-band or out-of-band communication arrangements can be used to allow a host device to obtain information characterizing storage-side local-remote designations from one or more storage arrays in illustrative embodiments.

As another example, in some embodiments, the host device 102-1 obtains the information characterizing the local-remote designations of the first and second storage arrays 105 in conjunction with obtaining Asymmetric Logical Unit Access (ALUA) information of one or more logical storage devices from at least one of the first and second storage arrays 105.

The information characterizing local-remote designations is illustratively obtained from one or more storage-side data structures maintained by at least one of the first and second storage arrays 105, and is stored under the control of the MPIO driver 112-1 in one or more host-side data structures of the host device 102-1.

In some embodiments, the first and second storage arrays 105 are arranged in a metro/stretched configuration relative to one another, or another type of active-active configuration relative to one another. Other types of configurations in which one of the storage arrays 105 is at least temporarily designated as local and the other one of the storage arrays is at least temporarily designated as remote can be used.

In one or more such configurations, a given LUN, logical storage volume or other logical storage device is illustratively accessible to the multi-path layer of the host device 102-1 via a first set of paths to the first storage array 105-1 and a second set of paths to the second storage array 105-2.

For example, the first and second sets of paths may be associated with two different "legs" of a metro/stretched configuration, active-active configuration or other configuration involving two different storage arrays 105, possibly at different physical locations, although numerous alternative configurations are possible. Each of the arrays is illustratively associated with or "on" a corresponding one of the legs. Some embodiments herein provide an advantageous methodology to ensure that performance is not undermined even when the two arrays on the two legs have substantially different performance characteristics.

In some embodiments, adjusting path selection in the multi-path layer of the host device 102-1 based at least in part on the obtained information characterizing the local-remote designations of the respective first and second storage arrays 105 comprises adjusting the path selection to favor one or more of the paths to the storage array designated as local over one or more of the paths to the storage array designated as remote.

Additionally or alternatively, adjusting path selection in the multi-path layer of the host device 102-1 based at least in part on the obtained information characterizing the local-remote designations of the respective first and second storage arrays 105 illustratively comprises adjusting weights assigned to respective ones of at least a subset of the paths for use by a path selection algorithm of the multi-path layer in selecting paths for delivery of IO operations from the host device 102-1 to the first and second storage arrays 105. For example, in a path selection algorithm that weights the paths in its selection process such that more heavily weighted paths to a given LUN or other logical storage device are selected prior to less heavily weighted paths to the given LUN or other logical storage device, for delivery of an IO operation targeting the given LUN or other logical storage device, weights to the storage array having a storage-side designation of local can be increased while weights to the storage array having a storage-side designation of remote can be decreased, relative to weights that would otherwise have been used for path selection absent use of the techniques disclosed herein. Other types of weight adjustments can be implemented in other embodiments.

Illustrative embodiments disclosed herein can additionally or alternatively adjust path selection in the multi-path layer of the host device 102-1 by adjusting at least one of a path selection algorithm of the multi-path layer and a failover algorithm of the multi-path layer to favor the first set of paths over the second set of paths. In some embodiments, both path selection and failover algorithms of the host device 102-1 are aligned to the obtained information characterizing the local-remote designations of the storage arrays 105.

Numerous additional or alternative types of path selection adjustment can be made in the host device 102-1 based at least in part on the obtained information characterizing the local-remote designations of the storage arrays 105.

As indicated above, illustrative embodiments provide functionality for multi-pathing load balancing and/or failover policy aligned to array-designated local/remote indicators in a metro/stretched configuration or other active-active configuration for accessing one or more LUNs or other logical storage devices from one or more host devices, although the functionality can be readily adapted for use in other configurations involving multiple storage arrays or other types of storage systems.

It should be noted that metro/stretched configurations and other active-active configurations are used in many modern data centers. In an example of such a configuration, a given logical unit or LUN, also referred to herein as a logical storage volume or logical storage device, is exposed through two distinct storage arrays, providing a consistent view of the logical storage volume with its data synchronized in both storage arrays. In a uniform host connectivity arrangement, a given host device is connected to both of the storage arrays in the metro/stretched configuration, as illustrated in the FIG. 1 embodiment, such that a given logical storage volume is accessible via multiple paths to both storage arrays. Storage administrators when connecting hosts to the storage arrays in a metro/stretched configuration may have an option to designate which storage array should be considered remote, with the other being considered local, or vice versa. This designation helps to balance the host connectivity, failover operations and workload distribution across the two storage arrays.

Some multi-pathing software drivers implement load balancing and failover policies in such a metro/stretched configuration, but do not accurately and effectively account for array-designated local/remote indicators. For example, a storage administrator, more generally referred to herein as a user, may have designated a particular one of the storage arrays as remote (i.e., array-designated remote) and the other as local (i.e., array-designated local). This designation illustratively sets a guidance to prefer usage of array-designated local paths over array-designated remote paths. However, the multi-pathing software drivers are not configured to identify and distinguish between paths belonging to the array-designated local and array-designated remote storage arrays, and as a result multi-pathing functionality may not be optimal in terms of taking into account the array local-remote designations, by failing to give preference to array-designated local paths over array-designated remote paths.

Illustrative embodiments disclosed herein address these and other issues by configuring multi-pathing software on a host device to identify and clearly differentiate between array-designated local paths and array-designated remote paths in its path selection for delivery of IO operations to the storage arrays.

Such arrangements in some embodiments are more particularly configured to providing multi-pathing load balancing and failover policy functionality that is aligned to array-designated local/remote indicators in a metro/stretched configuration or other configuration involving multiple storage arrays at least one of which is at least temporarily designated as local and at least one other of which is at least temporarily designated as remote.

In some embodiments, the multi-pathing software can make its own determination of which of the two storage arrays is local and which is remote, possibly by computing latency between a given host device and each storage array, with the higher latency indicating the remote array. However, such a host-side local-remote determination that is made independently of the actual storage-side local-remote designation could well conflict with the storage-side local-remote designation. The storage-side local-remote designation in some embodiments impacts various SCSI command properties such as ALUA states for paths, and similarly for other storage access protocols such as NVMe.

Absent use of the techniques disclosed herein, the multi-pathing software on the host device is generally unaware of the actual storage-side local-remote designation, leading to potential inefficiencies in load balancing and failover, for various ALUA configurations and in numerous other contexts.

In some embodiments, host device 102-1 via its multi-pathing software is configured to receive, derive or otherwise obtain hints or other indications from one or both of the storage arrays 105 regarding the storage-side local-remote designation. The multi-pathing software is configured to obtain such information and to utilize it in path selection in conjunction with load balancing and failover. For example, such information can be made available to the host device by a given storage array via a mode sense command, a log sense command, or other read-like command issued by the host device to the storage array. Vendor unique commands of various types and formats can additionally or alternatively be used.

An example algorithm for path selection aligned to storage-side local-remote designations implemented in the FIG. 1 embodiment illustratively includes the following steps, although additional or alternative steps could be used in other embodiments:

1. Each storage array 105 maintains its storage-side local-remote designation information in one or more tables or other data structures on that storage array.
2. The MPIO driver 112-1 of host device 102-1 periodically or under other conditions issues one or more commands to obtain such information from one or both of the storage arrays 105.
3. The MPIO driver 112-1 utilizes the obtained information in performing path selection for delivery of IO operations directed to one or more LUNs or other logical storage volumes comprising data stored on the storage arrays 105.

In some embodiments, the MPIO driver 112-1 implemented at least in part using the multi-pathing software of the host device 102-1 extracts or otherwise obtains the storage-side local-remote designation in conjunction with determining the SCSI ALUA access state of the storage arrays 105, or under other specified conditions, and similarly for other storage access protocols such as NVMe.

After determining the storage-side local-remote designation, the MPIO driver 112-1 illustratively updates one or more of its host-side tables or other data structures to include such information, so that it will be available as needed in path selection.

It should be noted that illustrative embodiments encompass any of a wide variety of different arrangements that allow the MPIO driver 112-1 to obtain from one or both of the storage arrays 105 the storage-side local-remote designation information. For example, such information can be requested by the MPIO driver 112-1 from one or both of the storage arrays 105, sent periodically from one or both of the storage arrays 105 to the MPIO driver 112-1, and/or obtained by the MPIO driver 112-1 from an intermediary device that obtains the information from one or more of the storage arrays 105. The intermediary device may comprise, for example, the above-noted MPIO management station that has access to the storage arrays 105, from which the MPIO driver 112-1 can obtain storage array related information such as the storage-side local-remote designation.

In some embodiments, the MPIO driver 112-1 utilizes the obtained storage-side local-remote designation information to alter the manner in which it performs path selection for load balancing and/or failover. The information generally allows the MPIO driver 112-1 to identify which paths are associated with the storage-side designated remote array and which paths are associated with the storage-side designated local array. The MPIO driver 112-1 alters the manner in which it performs load balancing and/or failover by, for example, modifying the weights assigned to the different paths so as to favor paths to the local array over paths to the remote array in selecting paths for accessing one or more LUNs or other logical storage devices. Additional or alternative techniques can be used. For example, the MPIO driver 112-1 can be configured so as not to select any array-designated remote path to a given LUN or other logical storage device as long as at least one array-designated local path to the given LUN or other logical storage device remains available.

At least portions of the functionality for path selection aligned to storage-side local-remote designations in illustrative embodiments is implemented within or otherwise utilizing the MPIO driver 112-1. For example, the MPIO driver 112-1 in some embodiments is configured to perform at least portions of the above-noted obtaining information characterizing storage-side local-remote designations of the storage array 105, and adjusting path selection based at least in part on the obtained information.

Although MPIO driver 112-1 is utilized to perform certain aspects of the functionality for path selection aligned to storage-side local-remote designations in some embodiments, this is by way of illustrative example only, and other embodiments need not utilize MPIO drivers in implementing such functionality. For example, Linux native multi-pathing arrangements utilizing device mappers, or other types and arrangements of host device components, can be configured to obtain information characterizing storage-side local-remote designations of the storage array 105, and adjust path selection in one or more host devices based at least in part on the obtained information as disclosed herein.

In addition, although the above-described functionality for path selection aligned to storage-side local-remote designations is primarily described above in the context of host device 102-1 and its MPIO driver 112-1, it is assumed that similar functionality for path selection aligned to storage-side local-remote designations is implemented by host device 102-2 and its MPIO driver 112-2.

As indicated above, the above-described functionality for path selection aligned to storage-side local-remote designations is illustratively carried out at least in part utilizing the MPIO driver 112-1 and its path selection logic 114-1. For example, in some embodiments, the functionality for path selection aligned to storage-side local-remote designations can be implemented substantially entirely under the control of the MPIO driver 112-1, and in such embodiments the path selection logic 114-1 is illustratively configured to control performance of one or more steps of the example process to be described below in conjunction with FIG. 2. Additional or alternative host device components, such as additional or alternative logic components logic implemented in the host device, can be used to control performance of the FIG. 2 process or other algorithms in illustrative embodiments.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed functionality for path selection aligned to storage-side local-remote designations.

Accordingly, aspects of functionality for path selection aligned to storage-side local-remote designations described above in the context of the first MPIO driver 112-1 and the first host device 102-1 are assumed to be similarly performed by the other MPIO driver 112-2 and the other host device 102-2.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, additional or alternative logic instances or other components implemented in the host devices 102 and the storage arrays 105 can be used to perform at least portions of the functionality for path selection aligned to storage-side local-remote designations.

The operation of the information processing system 100 will now be described in further detail with reference to the flow diagram of the illustrative embodiment of FIG. 2. The process as shown includes steps 200 through 204, and is suitable for use in the system 100 but is more generally applicable to other types of systems comprising a host device and a storage system. The host device illustratively comprises a given one of the first and second host devices 102-1 and 102-2 of FIG. 1, and the first and second storage arrays illustratively comprise respective ones of the storage arrays 105, with each such storage array comprising a plurality of storage devices. The storage devices of each such storage array are assumed to include logical storage devices such as LUNs or other logical storage volumes.

Figure 2:
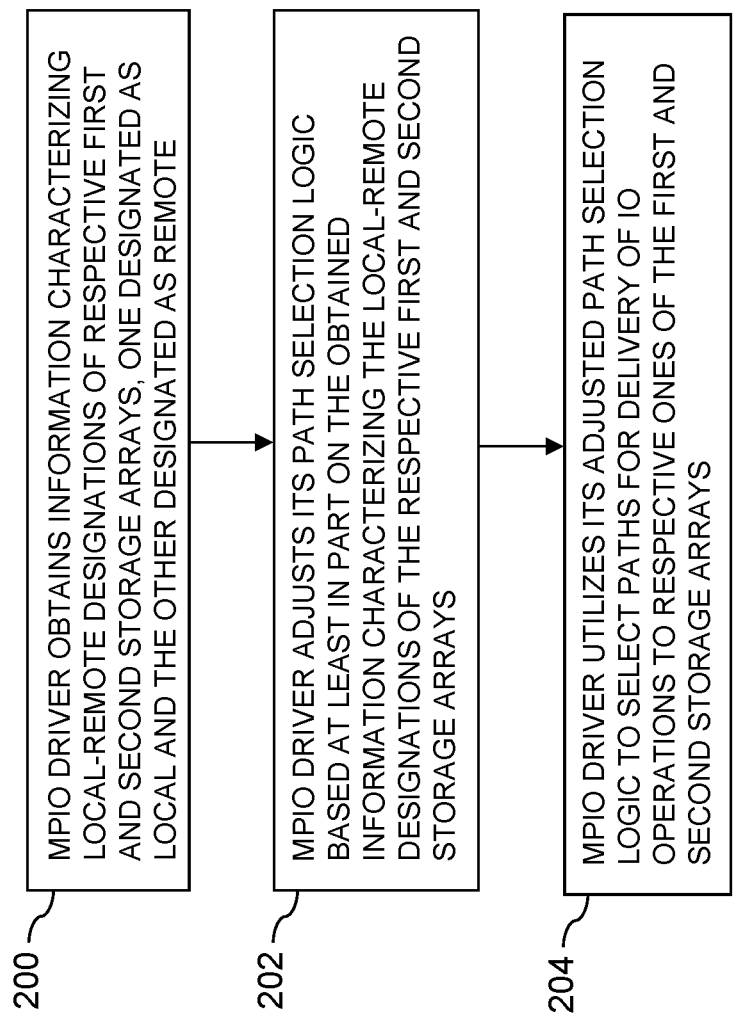
FIG. 2 is a flow diagram illustrating an example process for host device multi-pathing aligned to storage-side local-remote designations in an illustrative embodiment.

The steps of the FIG. 2 process are illustratively performed at least in part by or under the control of an MPIO layer comprising one or more MPIO drivers of respective host devices, such as the MPIO drivers 112-1 and 112-2 of the first and second host devices 102-1 and 102-2 of system 100, although other arrangements of system components can control or perform at least portions of one or more of the steps in other embodiments. At least portions of the functionality of the FIG. 2 process may be performed at least in part in conjunction with a load balancing algorithm or other type of path selection algorithm executed by instances of path selection logic 114 of one or more MPIO drivers 112. A given host device is referred to as simply a "host" in some description herein.

In step 200, an MPIO driver of a host device obtains information characterizing local-remote designations of respective first and second storage arrays, one of which is designated as local and the other of which is designated as remote. The first and second storage arrays are illustratively arranged, for example, in a metro/stretched configuration or other active-active configuration providing access to LUNs or other types of logical storage devices that are replicated across the two storage arrays, where storage-side local-remote designations are established for the storage arrays without involvement of the host device. Each of the logical storage devices illustratively comprises a LUN or other type of logical storage volume or logical storage device implemented using one or more storage devices of the first and second storage arrays. The configuration of the first and second storage arrays illustratively involves the host device communicating with the first storage array over a first set of paths and communicating with the second storage array over a second set of paths, where the first and second sets of paths have different performance characteristics, and the host device would not otherwise be aware of the storage-side local-remote designations of the respective storage arrays. Such information is illustratively obtained by the MPIO driver from the storage arrays using storage access protocol commands such as log sense, mode sense, vendor unique or other types of commands in accordance with a given storage access protocol such as SCSI or NVMe, although a wide variety of other techniques can be used to obtain the information, such as indirect techniques involving at least one intermediary device.

In step 202, the MPIO driver of the host device adjusts its path selection logic based at least in part on the obtained information characterizing the local-remote designations of the respective first and second storage arrays.

In step 204, the MPIO driver utilizes its adjusted path selection logic to select paths for delivery of IO operations to respective ones of the first and second storage arrays.

The steps of the FIG. 2 process are shown in sequential order for clarity and simplicity of illustration only, and certain steps can at least partially overlap with other steps. Also, different ones of the steps can be performed at least in part by different host device components, such as additional or alternative components of the host device. Such components are illustratively part of an MPIO layer comprising one or more MPIO drivers, but in other embodiments can be implemented elsewhere in the host device.

As indicated above, different instances of the FIG. 2 process can execute at least in part in parallel with one another for different path selection processes involving different logical storage devices or other components. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for path selection aligned to storage-side local-remote designations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different path selection arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
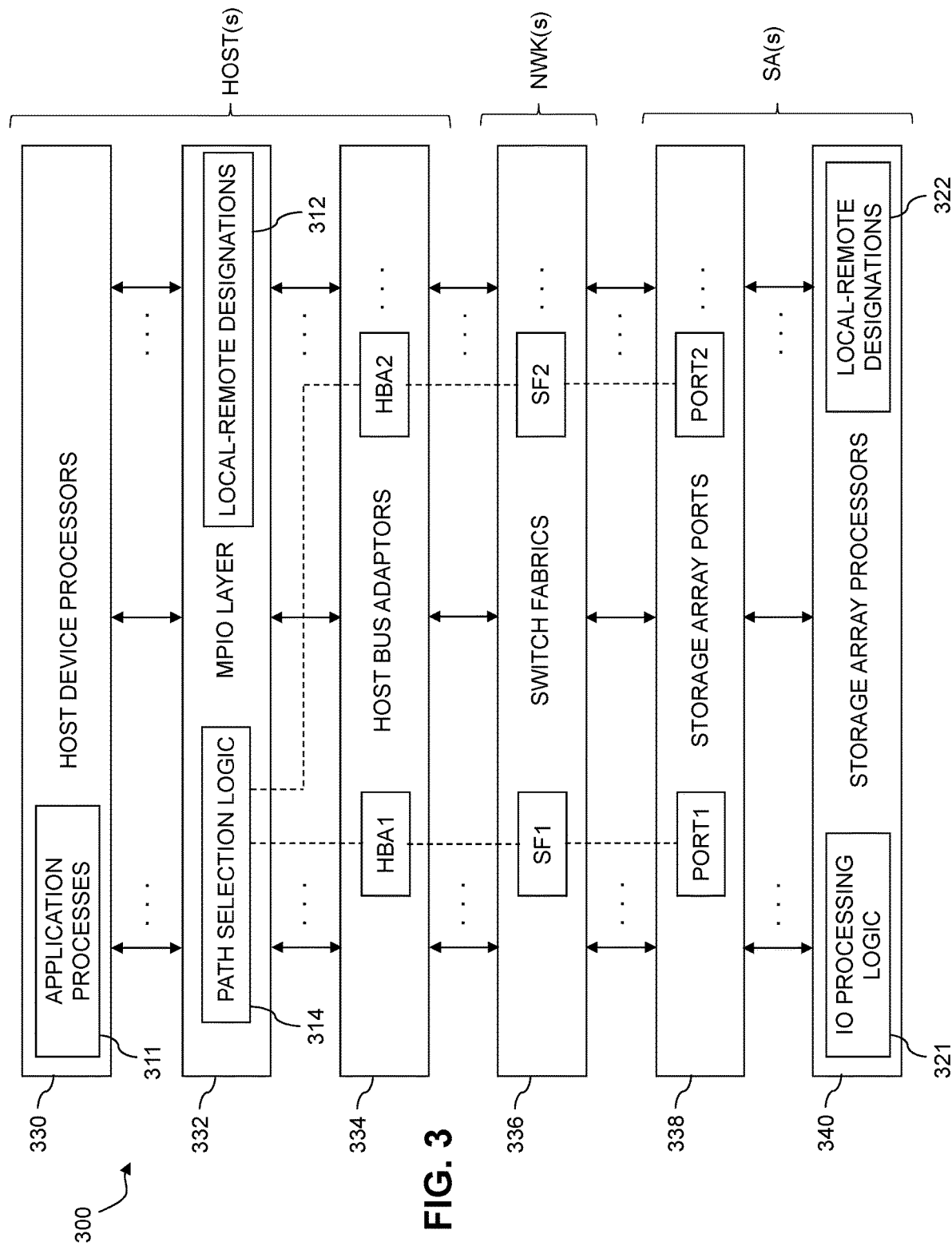
FIG. 3 is a block diagram showing multiple layers of a layered system architecture that includes functionality for host device multi-pathing aligned to storage-side local-remote designations in an illustrative embodiment.

Referring now to FIG. 3, another illustrative embodiment is shown. In this embodiment, an information processing system 300 comprises host-side components that include local-remote designations 312 and path selection logic 314, and storage-side components that include IO processing logic 321 and local-remote designations 322. Additional or alternative host-side and storage-side components can be used in other embodiments. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements functionality for path selection aligned to storage-side local-remote designators of respective storage arrays. The paths are utilized to access logical storage devices of the storage arrays, with the logical storage devices storing data for one or more application processes 311 running in one or more host device processors of the host device processor layer 330. The functionality for path selection aligned to storage-side local-remote designations in this embodiment is assumed to be controlled at least in part by the path selection logic 314, although other arrangements are possible. The path selection logic 314 can include multiple distinct path selection logic instances for respective ones of a plurality of host devices of the system 300.

The IO processing logic 321 implemented in the storage array processor layer 340 performs various types of processing for servicing of read requests, write requests and other types of IO operations received from one or more host devices of the system 300. The local-remote designations 322 illustratively comprise storage-side local-remote designations maintained by one or more of the storage arrays in one or more data structures. In some embodiments, there may be separate instances of the IO processing logic 321 and the local-remote designations 322 for each of a plurality of storage arrays of the system 300.

The host-side components including path selection logic 314 and local-remote designations 312 operate in conjunction with the storage-side components including IO processing logic 321 and local-remote designations 322 to implement at least portions of the functionality for path selection aligned to storage-side local-remote designations as disclosed herein. More particularly, one or more MPIO drivers of the MPIO layer 332 illustratively obtain storage-side local-remote designations 322 from one or more storage arrays, store those same obtained storage-side local-remote designations as local-remote designations 312 within the MPIO layer 332, and utilize the local-remote designations 312 in implementing path selection in path selection logic 314 for delivery of IO operations.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300 as previously described. As indicated above, the path selection logic 314 in some embodiments operates in conjunction with the local-remote designations 312, the IO processing logic 321 and the local-remote designations 322 in implementing at least portions of the functionality for path selection aligned to storage-side local-remote designations as disclosed herein. For example, an MPIO driver of the MPIO layer 332 illustratively includes an instance of the path selection logic 314, and establishes the local-remote designations 312 by interacting with the one or more storage arrays to obtain information characterizing the storage-side local-remote designations 322. This ensures that the local-remote designations 312 in the MPIO layer 332 are aligned to and therefore consistent with the storage-side local-remote designations 322. The MPIO driver then configures or otherwise adjusts its instance of the path selection logic 314 to take the local-remote designations 312 into account in selecting paths for delivery of IO operations to the one or more storage arrays. Additional or alternative layers and logic circuitry arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300, through their respective instances of components 312, 321 and 322, provide functionality for path selection aligned to storage-side local-remote designations as disclosed herein, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Referring now to FIG. 4, an example of a set of local-remote designation information 400 maintained by an MPIO driver of a host device is shown. The local-remote designation information 400 includes information characterizing storage-side local-remote designations established for respective storage arrays, as obtained from one or more of the storage arrays, but is maintained by the MPIO driver in one or more data structures of the host device. The local-remote designation information 400 in this embodiment is illustratively maintained by the MPIO driver for particular LUNs that are denoted LUN 1, LUN 2, . . . LUN X in the figure. These LUNs may comprise all of the LUNs of the storage arrays, or a designated subset of the LUNs of the storage arrays. Different sets of local-remote designation information similar to local-remote designation information 400 may be maintained for respective different sets of LUNs of the storage arrays. The local-remote designation information 400 maintained by the MPIO driver of the host device may be viewed as comprising one possible example of local-remote designations 312 in the FIG. 3 embodiment.

The local-remote designation information 400 more particularly includes path identifiers and respective local-remote designators for each of a plurality of paths for each of the LUNs denoted LUN 1 through LUN X. The local-remote designators can each be in the form of a binary indicator, providing an indication of whether or not a particular corresponding path is a path to a local array or a path to a remote array. Other types of single bit or multi-bit local-remote designators can be used in other embodiments.

Although the local-remote designation information 400 is illustratively maintained on a per-LUN basis in this embodiment, other embodiments can maintain similar information in other ways using other formats.

The particular local-remote designation information arrangement shown in FIG. 4 is only an example, and numerous other types and arrangements of local-remote designation information can be maintained by a host device in other embodiments. Terms such as "information characterizing local-remote designations for respective storage systems" as used herein are intended to be broadly construed.

As indicated above, the MPIO driver of the host device can obtain storage-side local-remote designations from one or more storage arrays, and utilize that obtained information in maintaining the local-remote designation information 400 in one or more data structures of the host device. For example, the local-remote designation information 400 can be stored in a data structure of a kernel-space portion of the MPIO driver 112-1, although other storage arrangements with other types of data structures can be used.

In some embodiments, an MPIO driver obtains storage-side local-remote designations for use in maintaining the local-remote designation information 400 directly from at least one storage array, through interaction with the storage array as described elsewhere herein. For example, the MPIO driver is illustratively configured to obtain the storage-side local-remote designations directly from the storage array utilizing an in-band communication mechanism in which one or more commands in a designated storage protocol are sent from the MPIO driver or another host device component to the storage array.

However, it is possible in some embodiments that one or more MPIO drivers of one or more host devices can obtain the storage-side local-remote designations other than through direct communication with the storage array. Such arrangements illustratively involve obtaining the storage-side local-remote designations indirectly from the storage array utilizing an out-of-band communication mechanism via at least one intermediary device, such as an MPIO management station, which may comprise one or more servers.

Referring now to FIG. 5, an example in-band communication command is shown. This command comprises a six-byte mode sense command and is utilized in an illustrative embodiment to allow a host device to obtain information characterizing storage-side local-remote designations of first and second storage arrays. The page code is illustratively set to 0x00 and the subpage code illustratively comprises a serial number of an array and further defines a designator field for the array indicating local or remote. A response to this mode sense command illustratively provides the host device with the storage-side local-remote designator for the array to which the command is sent by the host device. Other types of commands, such as log sense commands, vendor unique commands, and combinations of multiple commands, can additionally or alternatively be used to obtain such information.

The host device illustratively utilizes the obtained information to maintain the local-remote designation information 400. In some embodiments, the host device can obtain the serial number of the storage array using an Inquiry Page 80h command, and can obtain target port identifiers using an Inquiry Page 83h command. Such information is illustratively utilized in conjunction with the obtained storage-side local-remote designations in maintaining the local-remote designation information in one or more host-side data structures.

FIGS. 6 and 7 show examples of multi-pathing software code implemented in a multi-path layer of one or more host devices in illustrative embodiments. Referring initially to FIG. 6, the illustrated software code configures an example data structure denoted "storageMetrodesignator" that in this embodiment includes a 32-bit serial number ("storageSN") for a storage array and a corresponding single-bit local-remote designator ("storageDesignatedStatus") for that storage array. Again, other types of data structures and local-remote designators can be used in other embodiments. The software code of FIG. 7 illustrates one possible arrangement for increasing the weights for one or more paths to an array-designated remote storage array, such that those paths will be disfavored relative to paths to an array-designated local storage array in path selection.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for aligned path selection can be performed by different MPIO drivers in different host devices, or using other types of host drivers, such as, for example, iSCSI drivers.

The particular arrangements described above are therefore presented by way of illustrative example only. Numerous alternative arrangements of these or other features can be used in implementing aligned path selection in other illustrative embodiments.

It is apparent from the foregoing that the illustrative embodiments disclosed herein can provide a number of significant advantages relative to conventional arrangements.

For example, some embodiments configure host devices to include functionality for path selection aligned to storage-side local-remote designations of respective storage arrays or other storage systems.

These and other embodiments can provide significantly improved performance, for example, in metro/stretched configurations, active-active configurations or other configurations of at least first and second storage systems, in which a host device communicates with the first storage system over a first set of paths and communicates with the second storage system over a second set of paths, where the first and second sets of paths have substantially different performance characteristics.

The disclosed functionality can be implemented using a wide variety of different host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as an Amazon Web Services (AWS) system, a Google Cloud Platform (GCP) system and a Microsoft Azure system. Virtual machines provided in such cloud-based systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a central processing unit (CPU), a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, local-remote designation information data structures, and additional or alternative components. Also, the particular configurations of system and device elements and associated processing operations illustratively shown in the drawings can be varied in other embodiments. For example, a wide variety of different host device and storage system configurations, and associated aligned path selection techniques, can be used in other embodiments. Moreover, the various assumptions made above in the course of describing the illustrative embodiments should also be viewed as exemplary rather than as requirements or limitations.

Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to obtain in a host device information characterizing local-remote designations of respective first and second storage systems, one of which is designated as local and one of which is designated as remote; and
   to adjust path selection in a multi-path layer of the host device based at least in part on the obtained information characterizing the local-remote designations of the respective first and second storage systems;
   wherein the local-remote designations of the respective first and second storage systems comprise respective storage-side local-remote designations each of which characterizes the respective corresponding storage system as a whole as being either local or remote relative to the host device; and
   wherein the storage-side local-remote designations are automatically given priority in the host device over any conflicting host-side local-remote designations that are determined in the host device based at least in part on measured latencies between the host device and respective ones of the first and second storage systems.

2. The apparatus of claim 1 wherein said at least one processing device comprises at least a portion of the host device.

3. The apparatus of claim 1 wherein the multi-path layer comprises at least one multi-path input-output driver configured to control delivery of input-output operations from the host device to the first and second storage systems over selected paths through a network over which the host device communicates with the first and second storage systems.

4. The apparatus of claim 3 wherein said at least one multi-path input-output driver is configured to issue one or more commands to at least one of the first and second storage systems in order to obtain in response thereto the information characterizing the local-remote designations of the respective first and second storage systems.

5. The apparatus of claim 4 wherein at least one of the one or more commands comprises at least one of a log sense command, a mode sense command and a vendor unique command.

6. The apparatus of claim 1 wherein the first and second storage systems are arranged in an active-active configuration relative to one another.

7. The apparatus of claim 1 wherein a given logical storage device is accessible to the multi-path layer of the host device via a first set of paths to the first storage system and a second set of paths to the second storage system.

8. The apparatus of claim 7 wherein adjusting path selection in the multi-path layer of the host device based at least in part on the obtained information characterizing the local-remote designations of the respective first and second storage systems comprises adjusting the path selection to favor one or more of the paths to the storage system designated as local over one or more of the paths to the storage system designated as remote.

9. The apparatus of claim 7 wherein adjusting path selection in the multi-path layer of the host device based at least in part on the obtained information characterizing the local-remote designations of the respective first and second storage systems comprises adjusting weights assigned to respective ones of at least a subset of the paths for use by a path selection algorithm of the multi-path layer in selecting paths for delivery of input-output operations from the host device to the first and second storage systems.

10. The apparatus of claim 7 wherein adjusting path selection in the multi-path layer of the host device based at least in part on the obtained information characterizing the local-remote designations of the respective first and second storage systems comprises adjusting at least one of a path selection algorithm of the multi-path layer and a failover algorithm of the multi-path layer to favor the first set of paths over the second set of paths.

11. The apparatus of claim 1 wherein obtaining in the host device information characterizing local-remote designations of respective first and second storage systems comprises obtaining the information in conjunction with obtaining asymmetric logical unit access information of one or more logical storage devices from at least one of the first and second storage systems.

12. The apparatus of claim 1 wherein obtaining in the host device information characterizing local-remote designations comprises obtaining the information from one or more storage-side data structures maintained by at least one of the first and second storage systems.

13. The apparatus of claim 12 wherein at least portions of the obtained information are stored in one or more host-side data structures of the host device.

14. A computer program product comprising a non-transitory processor-readable storage medium having stored therein program code of one or more software programs, wherein the program code, when executed by at least one processing device comprising a processor coupled to a memory, causes said at least one processing device:
   to obtain in a host device information characterizing local-remote designations of respective first and second storage systems, one of which is designated as local and one of which is designated as remote; and
   to adjust path selection in a multi-path layer of the host device based at least in part on the obtained information characterizing the local-remote designations of the respective first and second storage systems;
   wherein the local-remote designations of the respective first and second storage systems comprise respective storage-side local-remote designations each of which characterizes the respective corresponding storage system as a whole as being either local or remote relative to the host device; and
   wherein the storage-side local-remote designations are automatically given priority in the host device over any conflicting host-side local-remote designations that are determined in the host device based at least in part on measured latencies between the host device and respective ones of the first and second storage systems.

15. The computer program product of claim 14 wherein a given logical storage device is accessible to the multi-path layer of the host device via a first set of paths to the first storage system and a second set of paths to the second storage system.

16. The computer program product of claim 15 wherein adjusting path selection in the multi-path layer of the host device based at least in part on the obtained information characterizing the local-remote designations of the respective first and second storage systems comprises adjusting the path selection to favor one or more of the paths to the storage system designated as local over one or more of the paths to the storage system designated as remote.

17. A method comprising:
obtaining in a host device information characterizing local-remote designations of respective first and second storage systems, one of which is designated as local and one of which is designated as remote; and
adjusting path selection in a multi-path layer of the host device based at least in part on the obtained information characterizing the local-remote designations of the respective first and second storage systems;
wherein the local-remote designations of the respective first and second storage systems comprise respective storage-side local-remote designations each of which characterizes the respective corresponding storage system as a whole as being either local or remote relative to the host device;
wherein the storage-side local-remote designations are automatically given priority in the host device over any conflicting host-side local-remote designations that are determined in the host device based at least in part on measured latencies between the host device and respective ones of the first and second storage systems; and
wherein the method is performed by at least one processing device comprising a processor coupled to a memory.

18. The method of claim 17 wherein a given logical storage device is accessible to the multi-path layer of the host device via a first set of paths to the first storage system and a second set of paths to the second storage system.

19. The method of claim 18 wherein adjusting path selection in the multi-path layer of the host device based at least in part on the obtained information characterizing the local-remote designations of the respective first and second storage systems comprises adjusting the path selection to favor one or more of the paths to the storage system designated as local over one or more of the paths to the storage system designated as remote.

20. The method of claim 18 wherein adjusting path selection in the multi-path layer of the host device based at least in part on the obtained information characterizing the local-remote designations of the respective first and second storage systems comprises adjusting weights assigned to respective ones of at least a subset of the paths for use by a path selection algorithm of the multi-path layer in selecting paths for delivery of input-output operations from the host device to the first and second storage systems.

* * * * *